(12) United States Patent
Jeong

(10) Patent No.: US 6,512,052 B2
(45) Date of Patent: Jan. 28, 2003

(54) POLYPROPYLENE RESIN COMPOSITION FOR AUTOMOBILE INTERIOR COVERING MATERIALS

(75) Inventor: Kie-Youn Jeong, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/967,042

(22) Filed: Sep. 27, 2001

(65) Prior Publication Data

US 2002/0198322 A1 Dec. 26, 2002

(30) Foreign Application Priority Data

May 21, 2001 (KR) ........................................ 2001-27678

(51) Int. Cl.$^7$ ............................ C08L 23/04; C08F 10/00
(52) U.S. Cl. ........................ 525/240; 525/191; 525/222
(58) Field of Search ................................ 525/191, 222, 525/240

(56) References Cited

U.S. PATENT DOCUMENTS

| | | | | |
|---|---|---|---|---|
| 4,012,559 A | * | 3/1977 | Fujioka et al. | 428/463 |
| 5,082,743 A | * | 1/1992 | Itamura et al. | 428/520 |
| 5,094,921 A | * | 3/1992 | Itamura et al. | 428/476.3 |
| 5,389,709 A | * | 2/1995 | Itamura et al. | 524/239 |

* cited by examiner

Primary Examiner—Nathan M. Nutter
Assistant Examiner—Thao Tran
(74) Attorney, Agent, or Firm—Christie, Parker & Hale, LLP

(57) ABSTRACT

The present invention relates to a polypropylene resin composition for automobile interior covering methods capable of calender molding and high frequency welding. More particularly, the present invention relates to the polypropylene resin composition capable of calender molding and high frequency welding, which the same comprises a reactor-type polypropylene resin with excellent melt tension, an ethylene-vinyl acetate copolymer having polarity, an ethylene-glycidyl methacrylate-methyl acrylate terpolymer and a phthalate and thus useful for the automobile interior covering materials.

5 Claims, No Drawings

ＵＳ 6,512,052 B2

POLYPROPYLENE RESIN COMPOSITION FOR AUTOMOBILE INTERIOR COVERING MATERIALS

CROSS-REFERENCE TO RELATED APPLICATION

This application claims priority of Korea patent Application No. 2001-27678, filed on May 21, 2001.

BACKGROUND OF THE INVENTION

Field of the Invention

The present invention relates to a polypropylene resin composition for automobile interior covering materials capable of calender molding and high frequency welding. More particularly, the present invention relates to the polypropylene resin composition capable of calender molding and high frequency welding, which the same comprise a reactor-type polypropylene resin with excellent melt tension, an ethylene-vinyl acetate copolymer having polarity, an ethylene-glycidyl methacrylate-methyl acrylate terpolymer and a phthalate and thus useful for the automobile interior covering materials.

Core of an automobile sun visor, which absolves an impact and keeps up shape, is covered with interior covering materials for improvement in appearance and the circumference thereof is adhered by high frequency welding. The covering materials used for this purpose are supposed to have high melt tension and be manufactured into sheets by calender molding with low adhesion to a roll. And further, they are supposed to have sufficient polarity to be applicable for high frequency welding. Bead-type polypropylene foam (hereinafter referred to as "EPP FORM") is widely used for the core and polyvinyl chloride (hereinafter referred to as "PVC") calendaring sheet for the interior covering material. The PVC exhibits excellent melt tension and low adhesion to a roll thus, easily molded to sheet by calender molding. Further, the PVC has polarity because its is polarized to a positive charge for H and a negative charge for Cl due to H—C—Cl structure having significant difference in electronegativity between H and Cl, and thus be weldable with frictional heat generated from transition energy difference between H and Cl when high frequency is applied.

However, in recent years, it has been demanded not to use PVC resins owing to a problem of the poison of environmental hormones and a problem of the generation of a harmful dioxine gas at the time of the combustion of wastes. In Europe, it is not allowed to recover from used PVC resins by the combustion and only allowed for reclamation. And further, since the PVC resin is different class of resin from EPP FOAM used for the core and thus not incompatible, it has to be separated from the core for recycling.

Therefore, it has been highly demanded to use polypropylene resins which can be recovered by the combustion, be environmentally friend, and be recycled without separating out EPP FOAM used as the core from wastes, thus being free from the above-mentioned problems. The polypropylene resins have excellent physical characteristics such as tensile strength, modulus of bending elasticity, impact strength and chemical characteristics.

However, they have poor melt tension to be capable of being formed into sheets by calender molding and are not suitable for high frequency welding because they are structurally non-polar component. Therefore, it is necessary to secure high melt tension for calender molding and polarity for high frequency welding to use the polypropylene resins as the automobile interior covering materials such as sun visors.

SUMMARY OF THE INVENTION

Accordingly, the present invention has been made under such circumstances, and inventors have completed the present invention by obtaining a polypropylene resin composition comprising a reactor-type polypropylene resin which excellent melt tension, an ethylene-vinyl acetate compolymer having polarity and compatible with polypropylene resin, an ethylene-glycidyl methacrylate-methyl acrylate terpolymer and a phthalate for securing polarity to the surface of the sheet, from which there can be manufactured into sheets by calender molding without reducing physical characteristics and performed for high frequency welding to be applicable for automobile interior covering materials.

An object of the present invention is to provide a polypropylene resin composition for automobile interior covering materials capable of calender molding and high frequency welding.

Detailed Description of the Invention

The present invention is characterized by a polypropylene resin composition capable of calender molding and high frequency welding, which comprises:

(A) a reactor-type polypropylene resin selected from a copolymer of propylene and $C_2$ monomer and a copolymer of propylene and $C_4$–$C_{10}$ monomer;

(B) an ethylene-glycidyl methacrylate-methyl acrylate terpolymer;

(C) an ethylene-vinyl acetate compolymer; and (D) a phthalate.

The present invention is described in detail as set forth hereunder.

The present invention employs a reactor-type polypropylene (A) having excellent melt tension to allow a polarity to conventional polypropylene resins, wherein the polar polymer capable of being compatible with polypropylene resin is blended in an appropriate ratio to easily form sheets by calender molding and perform high frequency welding.

It is generally possible to add a reinforcing agent having high melt tension to improve the melt tension of the polypropylene resin and the most preferred method according to the present invention is use of reactor-type polypropylene resin prepared by special method. The reactor-type polypropylene resin of the present invention is a copolymer of propylene and $C_2$ monomer or a copolymer of propylene and $C_4$–$C_{10}$ monomer having a monomer content of more than 18 wt. %. However, the reactor-type polypropylene resin is usually prepared by copolymerizing propylene with $C_2$ monomer or $C_4$–$C_{10}$ monomer in the presence of Ziegler-Natta catalyst in the commercial polymerization reactor. At this time, the polypropylene resin has usually less than 18 wt. % of a content of monomer due to limitations of a used catalyst and a reactor and its results in being impossible to form the sheets by calender molding because the melt tension is insufficient for containing less than 18 wt. % of a monomer content.

However, the present invention uses reactor-type polypropylene resin having more than 18 wt. % of a monomer content, wherein the monomer is $C_2$ or $C_4$–$C_{10}$ monomer. The reason to call as the reactor-type polypropylene resin is that it is prepared by using special catalyst and reactor different from the conventional catalyst and reactor.

The reactor-type polypropylene resin is preferred to have 18–30 wt. % of a monomer content and less than 1 g/10 min (230° C.) of a melt index. If the melt index is higher than 1 g/10 min, it is impossible to form sheets by calender molding due to poor melt tension. Olefins as the $C_2$ or $C_4$–$C_{10}$ monomer are not restricted but can be ethylene, 1-butene, 4-methyl-1-pentene, 1-hexene, or 1-octene. The reactor-type polypropylene resin is preferred to be used in the range of from 44 to 55 wt. % to the total composition.

A compatibilizer is generally used to give polarity to the polypropylene resin by blending polar polymer and polypropylene resin. When a polypropylene is blended with a polar polymer having carboxylic acid, hydroxy, or epoxy group, it is preferred to use a compatibilizer to react with both the polar polymer and the polypropylene resin because non-polar polypropylene is incompatible with polar polymer. When the non-polar polypropylene is blended with the polar polymer without using a compatibilizer, there is a problem of the generation of the interfacial between non-polar polypropylene and polar polymer, thus resulting in inferior physical characteristics as sheets or even being impossible to form sheets by calender molding. However, if a polar polymer capable of being compatible with polypropylene resin is selected, it is able to be practical to obtain the polypropylene resin having polarity without using any compatibilizer and further without reducing physical characteristics.

The present invention employs an ethylene-glycidyl methacrylate-methyl acrylate terpolymer (B) and ethylene-vinyl acetate (C) having 20–30 wt. % of a vinyl acetate content to grant interior polarity for high frequency welding. The ethylene-glycidyl methacrylate-methyl acrylate terpolymer (B) can be used alone but it is very expensive and has a problem of the migration of low molecular weight compound to the roll surface during the calender molding. When ethylene-vinyl acetate (C) is used alone, it is cheap but it is insufficient to provide enough polarity to the polypropylene resin. Therefore, it is preferred to use both ethylene-glycidyl methacrylate-methyl acrylate terpolymer (B) and ethylene-vinyl acetate (C) in an appropriate ratio in the present invention.

Ethylene-glycidyl methacrylate-methyl acrylate terpolymer (B) of the present invention is used to provide interior polarity because the ethylene part of the ethylene-glycidyl methacrylate-methyl acrylate terpolymer behaves as a compatibilizer and the glycidyl methacrylate-methyl acrylate part provides the polarity. It is preferred to use ethylene-glycidyl methacrylate-methyl acrylate terpolymer (B) in the range of from 20 to 30 wt. % to the total composition. The more ethylene-glycidyl methacrylate-methyl acrylate terpolymer (B) is used, the more favorable it is for high frequency welding. However, if the amount is more than 30 wt. %, the manufacturing price may be highly increased and it may also migrate to the roll surface during the calender molding. On the other hand, if it is less than 20 wt. %, it is not practical for high frequency welding due to insufficient polarity.

The ethylene-vinyl acetate copolymer (C) having 20–30 wt. % of a vinyl acetate content is preferred to have 2–4 g/10 min (190° C.) of a melt index in the present invention. The ethylene part thereof is compatible with the polypropylene resin (A) and the other vinyl acetate part provides polarity. The more vinyl acetate content is used, the more favorable it is for high frequency welding. However, if the content of vinyl acetate is more than 30 wt. %, it may migrate to the surface of the roll during the calender molding. On the other hand, if it is less than 20 wt. % it is not practical for high frequency welding due to insufficient polarity. The ethylene-vinyl acetate copolymer (C) is used in the range of from 20 to 30 wt. % to the total composition. If the amount is used more than 30 wt. %, it may favorable for high frequency welding due to high polarity, but it may migrate to the surface of the roll during the calender molding. On the other hand, if the amount is less than 20 wt. %, ethylene-glycidyl methacrylate-methyl acrylate terpolymer (B), which is expensive, has to be correctively added more to provide sufficient polarity to the composition thus, resulting in an increase of the manufacturing price and it is practically impossible to form rolls by calender molding.

The present invention employs a phthalate to provide polarity on the surface of the sheet of the polypropylene resin composition. Preferred phthalate compound is a mixture of diisonoryl phthalate and diundecyl phthalate in 1:1. The above-mentioned the components (B) and (C) are used to provide polarity to the inner part of the sheets, because it is difficult to be dispersed on the surface of the sheets. Thus, the use of the phthalate having low molecular weight and polarity is essential to provide the polarity on the surface of the sheets for high frequency welding because high frequency cannot penetrate into inside sheet if there is no polarity on the surface. The phthalate (D) is used in the range of form 4 to 6 wt. % to the total composition. The more phthalate content is used, the more favorable it is for high frequency welding. However, if the content is more than 6 wt. %, it is separated out on the surface of the sheets and further decolorized. On the other hand, if the content is less than 4 wt. %, it is not practical for high frequency welding due to insufficient polarity.

Accordingly, the present invention is to provide a polypropylene resin composition to be useful for an automobile interior covering materials by securing the polarity to the non-polar polypropylene resin, thus being capable of calender molding, high frequency welding, eliminating odor, reducing fogging, solving decolorizing problem and improving durability such as heat resistance, weather resistance, light resistance and the like.

The present invention is explained in more detail based on the following examples but they should not be construed as limiting the scope of this invention.

EXAMPLES 1–2 and COMPARATIVE EXAMPLES 1–7

The polypropylene resin composition prepared with a ratio and content listed in Table 1 was dry-blended, fed to twin-screw extruder, and pelletized. The obtained pellets were passed between rolls having a diameter of 8 inches heated to 200° C., thereby forming the sheet. The prepared sheet was tested for high frequency welding and the result is summarized in table 1.

TEST METHOD

A sheet was formed with each polypropylene resin composition by the calender molding and cut to be 300 mm×50 mm×2 mm. EPP FOAM core was covered with the sheet and placed into a cupper metal box to test weldability in high frequency field.

(1) calender moldability: it was tested for that whether it is suitable for the production of a sheet by calender molding and whether the surface of the prepared sheet is favorable; and (2) weldability in high frequency field: it was tested with 2 methods:
   (a) method 1: determination of weldability by the naked eyes after high frequency welding; and
   (b) method 2: determination of weldability by the naked eyes after performing three times with the following cycle; in thermohydrostat (90° C. for 3 hrs→at room temperature for 1 hr→at −30° C. for 3 hrs→at room temperature for 1 hr→at 50° C., 95% RH for 10 hrs→at room temperature for 1 hr).

TABLE 1

| Category | | frequency field Content (wt. %) | | | | Calender mold-ability | Weldability in high | |
|---|---|---|---|---|---|---|---|---|
| | | A | A-1 | B | C | D | | After weld-ing | After heat resistance cycle |
| Exam. | 1 | 45 | — | 20 | 30 | 5 | Good | Good | Good |
| | 2 | 45 | — | 30 | 20 | 5 | Good | Good | Good |
| Com. | 1 | — | 47 | 24 | 24 | 5 | Impossible | — | — |
| Exam. | 2 | 50 | — | — | 45 | 5 | Sticky to roll | Poor | Poor |
| | 3 | 45 | — | 15 | 35 | 5 | Sticky to roll | Good | Poor |
| | 4 | 50 | — | 45 | — | 5 | Migration to sheet | Good | Good |
| | 5 | 45 | — | 35 | 15 | 5 | Migration to sheet | Good | Good |
| | 6 | 50 | — | 25 | 25 | — | Good | Good | Poor |
| | 7 | 45 | — | 24 | 24 | 7 | Migration to sheet | Good | Good |

A: Reactor type polypropylene resin (melt index of 0.6 g/10 min (230° C.), ethylene content of 18 wt. % and modulus of bending elasticity of 80 Mpa, Montell's product)
A-1: Polypropylene resin prepared by conventional polymerization (melt index of 3 g/10 min (230° C.) and ethylene content of 12 wt. %, 's product)
B: Ethylene-glycidyl methacrylate-methyl acrylate terpolymer (Goodyear's product)
C: Ethylene-vinyl acetate (vinyl acetate content of 26 wt. %, melt index of 3 g/10 min (190° C.))
D: Phthalate (Diisonoryl phthalate and diundecyl phthalate in 1:1)

As described above, the polypropylene resin composition of the present invention provides excellent moldability and is capable of welding in the high frequency to be useful as automobile interior covering materials such as sun visors, wherein the polypropylene resin composition comprises reactor-type polypropylene resin with excellent melt tension, ethylene-vinyl acetate copolymer having polarity, ethylene-glycidyl methacrylate-methyl acrylate terpolymer and phthalate. And further, the polypropylene resin composition is capable of being recycled without separation process depending on quality of materials and is environmentally friendly by replacing the conventional PVC resins which contain environmental hormones and generate toxic dioxine gas during the combustion of wastes.

What is claimed is:

1. A polypropylene resin composition of calender molding and high frequency welding, which comprises:

(A) a reactor polypropylene resin selected from the group consisting of a copolymer of propylene and $C_2$ monomer and a copolymer of propylene and $C_4$–$C_{10}$ monomer;

(B) an ethylene-glycidyl methacrylate-methylacrylate terpolymer;

(C) an ethylene-vinyl acetate; and (D) a phthalate.

2. The polypropylene resin composition capable of calender molding and high frequency welding according to claim 1, wherein said polypropylene resin composition comprises:

(A) 45–55 wt. % of a reactor polypropylene resin selected from the group consisting of a copolymer of propylene and $C_2$ monomer and a copolymer of propylene and $C_4$–$C_{10}$ monomer;

(B) 20–30 wt. % of an ethylene-glycidyl methacrylate-methylacrylate terpolymer;

(C) 20–30 wt. % of an ethylene-vinyl acetate; and (D) 406 wt. % of a phthalate.

3. The polypropylene resin composition capable of calender molding and high frequency welding according to claim 1, wherein said reactor polypropylene resin (A) has 18–30 wt. % of $C_2$ or $C_4$–$C_{10}$ monomer content and lower than 1 g/10 min (230° C.) of a melt index.

4. The polypropylene resin composition capable of calender molding and high frequency welding according to claim 1, wherein said ethylene-vinyl acetate (C) has 20–30 wt. % of vinyl acetate content and 2–4 g/10 min (190° C.) of a melt index.

5. The polypropylene resin composition capable of calender molding and high frequency welding according to claim 1, wherein said phthalate (D) is a mixture of diisonoryl phthalate and diundecyl phthalate in 1:1.

* * * * *